(12) United States Patent
Bouvier et al.

(10) Patent No.: US 6,804,748 B2
(45) Date of Patent: *Oct. 12, 2004

(54) INTELLIGENT BACKPLANE FOR SERIAL STORAGE ARCHITECTURES METHOD AND SYSTEM

(75) Inventors: Daniel L. Bouvier, Austin, TX (US); Kenneth L. Jeffries, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/238,139

(22) Filed: Sep. 10, 2002

(65) Prior Publication Data

US 2003/0014587 A1 Jan. 16, 2003

Related U.S. Application Data

(63) Continuation of application No. 09/543,177, filed on Apr. 5, 2000, now Pat. No. 6,505,272, which is a continuation of application No. 08/837,181, filed on Apr. 11, 1997, now Pat. No. 6,098,146.

(51) Int. Cl.[7] .............................................. G06F 12/00
(52) U.S. Cl. .............................. 711/114; 711/156; 714/1
(58) Field of Search ................................ 711/100, 170, 711/101, 111, 112, 114, 154, 156; 710/8, 110, 2; 700/1; 714/1

(56) References Cited

U.S. PATENT DOCUMENTS

| | | | |
|---|---|---|---|
| 3,701,132 A | 10/1972 | Bonyhard et al. ............ 365/15 |
| 3,733,588 A | 5/1973 | Conn ........................... 711/111 |
| 4,298,932 A | 11/1981 | Sams .......................... 711/202 |
| 4,344,132 A | 8/1982 | Dixon et al. .................. 710/60 |
| 5,283,872 A | 2/1994 | Ohnishi ....................... 710/311 |
| 5,367,647 A | 11/1994 | Coulson et al. ............. 710/105 |
| 5,452,420 A | 9/1995 | Engdahl et al. ............. 710/105 |
| 5,586,250 A | 12/1996 | Carbonneau et al. .......... 714/44 |
| 5,664,119 A | 9/1997 | Jeffries et al. .............. 710/302 |
| 5,680,579 A | 10/1997 | Young et al. ................ 711/157 |
| 5,729,763 A | 3/1998 | Leshem ........................ 710/38 |
| 5,758,171 A | 5/1998 | Ramamurthy et al. ....... 713/300 |
| 5,768,551 A | 6/1998 | Bleiweiss et al. ........... 710/316 |
| 5,797,018 A | 8/1998 | Tavallaei et al. ............ 710/200 |
| 5,809,337 A | 9/1998 | Hannah et al. .............. 710/333 |
| 5,812,752 A | 9/1998 | Yamada .......................... 714/5 |
| 5,835,700 A | 11/1998 | Carbonneau et al. .......... 714/44 |
| 5,875,313 A | 2/1999 | Sescila, III et al. ......... 710/305 |
| 5,931,958 A | 8/1999 | Bouvier et al. ............... 714/48 |
| 5,948,075 A | 9/1999 | Osten ............................ 710/8 |
| 5,966,510 A | 10/1999 | Carbonneau et al. .......... 714/44 |

(List continued on next page.)

FOREIGN PATENT DOCUMENTS

EP        WO 97/07458        2/1997        ........... G06F/11/10

OTHER PUBLICATIONS

Chervenak et al., "Performance of a Disk Array Protype", ACM SIGMETRICS Joint International Conference on Measurement and Modeling of Computer Systems, pp. 188–197, 1991.

Primary Examiner—Pierre Bataille
(74) Attorney, Agent, or Firm—Baker Botts L.L.P.

(57) ABSTRACT

A serial storage architecture (SSA) storage subsystem which includes an SSA initiator and a series of SSA targets which include disk drives housed in a storage pod and an intelligent backplane of the storage pod which houses the other SSA targets. The intelligent backplane includes a controller, a series of status registers, each indicating status of an operating parameter for the SSA target drives, and a series of control registers, each configured to transmit a respective command to selected ones of said SSA target drives. The controller polls each of the status registers and, based on the contents thereof, determines whether an event relating to the operating parameter has occurred. If so, the controller reports the event to the SSA initiator. The SSA initiator may also control the target drives using the control registers.

18 Claims, 6 Drawing Sheets

U.S. PATENT DOCUMENTS

| | | | |
|---|---|---|---|
| 6,076,142 A | * 6/2000 | Corrington et al. | 711/114 |
| 6,098,146 A | 8/2000 | Bouvier et al. | 711/100 |
| 6,148,352 A | 11/2000 | Coale et al. | 710/100 |
| 6,154,791 A | 11/2000 | Kimble et al. | 710/19 |
| 6,223,250 B1 | * 4/2001 | Yokono | 711/114 |
| 6,253,240 B1 | * 6/2001 | Axberg et al. | 710/8 |
| 6,272,573 B1 | * 8/2001 | Coale et al. | 710/100 |
| 6,279,049 B1 | * 8/2001 | Kang | 710/15 |
| 6,349,357 B1 | 2/2002 | Chong, Jr. | 711/111 |

\* cited by examiner

INTELLIGENT BACKPLANE FOR SERIAL STORAGE ARCHITECTURES METHOD AND SYSTEM

This application is a continuation of U.S. patent application Ser. No. 09/543,177 filed Apr. 5, 2000 by Daniel L. Bouvier et al. and entitled "Intelligent Backplane for Serial Storage Architectures," now U.S. Pat. No. 6,505,272, which is a continuation of U.S. patent application Ser. No. 08/837,181 filed Apr. 11, 1997 by Daniel L. Bouvier et al. and entitled "Intelligent Backplane for Collecting and Reporting Information in An SSA System," now U.S. Pat. No. 6,098,146.

BACKGROUND

1. Related Field

The present patent application generally relates to serial storage architecture (or "SSA") storage subsystems and, more particularly, to a SSA storage subsystem having a SSA initiator and an intelligent backplane configured for the exchange of status and control information with the SSA initiator.

2. Description of Related Art

Presently, many storage subsystems are based upon small computer systems interface (or "SCSI") architecture. Recently, however, considerable attention has been directed towards the development of storage subsystems based upon SSA. Generally, SSA-based storage subsystems are capable of providing higher level of performance, fault tolerance, data availability and connectivity than is possible with similar SCSI-based storage subsystems. SSA based storage subsystems also offer reduced interface costs. For example, SSA-based storage subsystems require no address switches and no discrete terminators.

SSA-based storage subsystems are arranged into a serial string of up to 128 devices, the ends of which are often connected to form a loop. Generally, such strings include an SSA initiator and any number of SSA targets, most commonly, storage devices such as drives, which execute commands received from the SSA initiator, mounted in drive bays. Each of the devices included in a string or loop has first and second full duplex ports. Each device in an SSA-based storage system is sequentially addressed based upon its location within the string. If a device is added or removed from the string, a number of the other devices in the string will require re-addressing. While this ability to dynamically re-address devices has eliminated the need for user configurable jumpers, it is often difficult to spatially locate a particular device within a large storage subsystem based upon a machine assigned numerical address. Specifically, when in the storage subsystem, the string bypasses selected drives within a drive pod or is comprised of drives installed in plural drive pods. Thus, the task of locating and replacing a failed drive often proves unnecessarily complicated. Accordingly, there is often the need to communicate physical information regarding the drives of the string.

SSA storage subsystems have yet to satisfy this need. LEDs physically installed at each drive may convey information regarding drive activity and/or status but cannot be used for remote monitoring and control. Alternately, while it is possible to install a separate communication path for remote monitoring and control, such a solution would be quite burdensome.

It can be readily seen from the foregoing that it would be desirable to provide an SSA storage subsystem in which status and control information may be exchanged between the SSA initiator and the physical location where the storage devices included in the SSA storage subsystem are installed. It is, therefore, the object of this invention to provide such an SSA storage subsystem.

SUMMARY

A serial storage architecture (SSA) storage subsystem includes a backplane, first and second storage devices connected to the backplane, an SSA initiator and a plurality of SSA targets, which include the backplane of the storage pod and the first and second storage devices, serially connected to the SSA initiator. In various aspects thereof, a controller and at least one status and/or control register may be provided on the backplane. Each status register indicates the status of an operating parameter of the storage devices coupled thereto. To report the occurrence of an event related to one of the operating parameters, the controller polls the status registers and, based upon the state thereof, the controller will determine whether to issue a notification to the SSA initiator. Each control register transmits control signals to the storage devices in response to instructions issued by the SSA initiator. Preferably, each status register includes a status bit corresponding to each storage device and each control register includes a control bit corresponding to each storage device. The occurrence of an event at a storage device related to an operating parameter is indicated if a status bit of the status register corresponding to the operating parameter undergoes a state change. Conversely, by asserting a selected control bit, the corresponding storage device will execute an instruction issued by the SSA initiator by enabling a control line which causes an activity to occur.

In various aspects thereof, the status registers may include a device present register for indicating the presence of a storage device within a drive bay, a device fault register for indicating the occurrence of a fault by the storage device and a drive write protect register for indicating whether the storage device is write protected. The control registers, on the other hand, may-include a bay power control register for controlling power to the storage devices and a device write protect register for switching the storage device into or out of write protect mode.

In other aspects thereof additional status and/or control capability may be provided to the backplane. In one such aspect, the backplane may include a thermal monitoring system for determining an internal operating temperature for a storage pod which houses the first and second storage devices. By analyzing thermal information polled thereby, the controller may determine the occurrence of thermal events. In another such aspect, the backplane may include a voltage monitoring system for determining voltage level for power supplied to the storage pod. By analyzing power information polled thereby, the controller may determine the occurrence of power events. In yet another such aspect, the backplane may include a fan speed register. By analyzing fan speed, the controller may determine the occurrence of fan speed events.

In one further such aspect, a control panel for displaying messages from the SSA initiator may also be provided.

DETAILED DESCRIPTION

Figure 1:
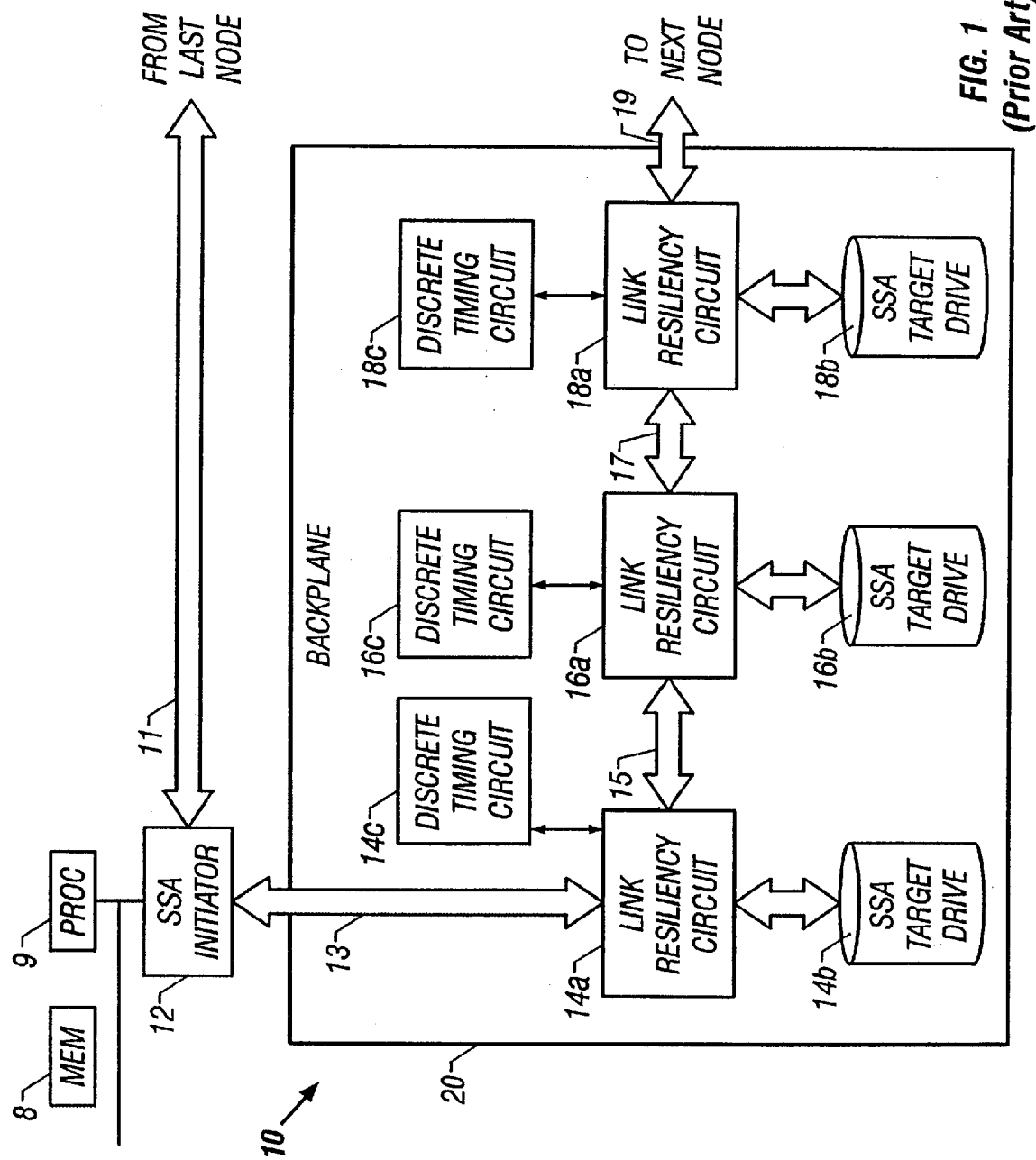
FIG. 1 is a block diagram of a conventional SSA storage subsystem.

Referring now to FIG. 1, a conventional SSA storage subsystem 10 which includes link resiliency circuits will now be described in greater detail. Storage subsystem 10 is coupled via a conventional bi-directional bus to processor 9 and memory 8 of a computer via SSA initiator 12. The combination of the processor 9, memory 8 and SSA storage subsystem 10 provides a computer system such as a server system. The SSA storage subsystem 10 is arranged as a SSA loop, i.e., a cyclic web containing dual-port nodes only. While a SSA loop may include as many as 128 dual-port nodes, for ease of illustration, only four such nodes are shown in FIG. 1. The illustrated nodes include SSA initiator 12, i.e., a node that issues commands, and first, second and third SSA targets 14, 16 and 18, i.e., nodes that execute commands. Link 11 couples the SSA initiator 12 to that portion of the SSA storage subsystem 10 included in the SSA loop but not illustrated in FIG. 1, link 13 couples the SSA initiator 12 to the first SSA target 14, link 15 couples the first SSA target 14 to the second SSA target 16, link 17 couples the second SSA target 16 and the third SSA target 18 and link 19 couples the third SSA target 18 with that portion of the SSA storage subsystem 10 included in the SSA loop but not illustrated in FIG. 1.

It should be clearly understood that, while the terms SSA targets and SSA initiators may encompass systems, devices and controllers, as disclosed herein, the first, second and third SSA targets 14, 16 and 18 are first, second and third drives, respectively and the SSA initiator 12 is a controller which controls I/O accesses to the first, second and third SSA targets 14, 16 and 18.

The first, second and third SSA target drives 14, 16 and 18 are attached to backplane 20. While not literally part of the SSA storage subsystem 10, backplane 26 is a device to which the first, second and third SSA target drives 14, 16 and 18 are attached. For example, the backplane 20 may be in a disk pod having a series of drive bays in which the first, second and third target drives 14, 16 and 18 are installed. The backplane 20 is non-intelligent. Thus, in the event of a drive failure, the backplane 20 would be unable to identify, isolate or issue an alert regarding the failing drive. Furthermore, while the target drives 14, 16 and 18 are attached to the backplane 20 are SSA targets, the backplane 20 itself is not. Thus, even if the backplane 20 were intelligent, the SSA initiator 12 would be unable to communicate with the backplane 20.

Figure 2:
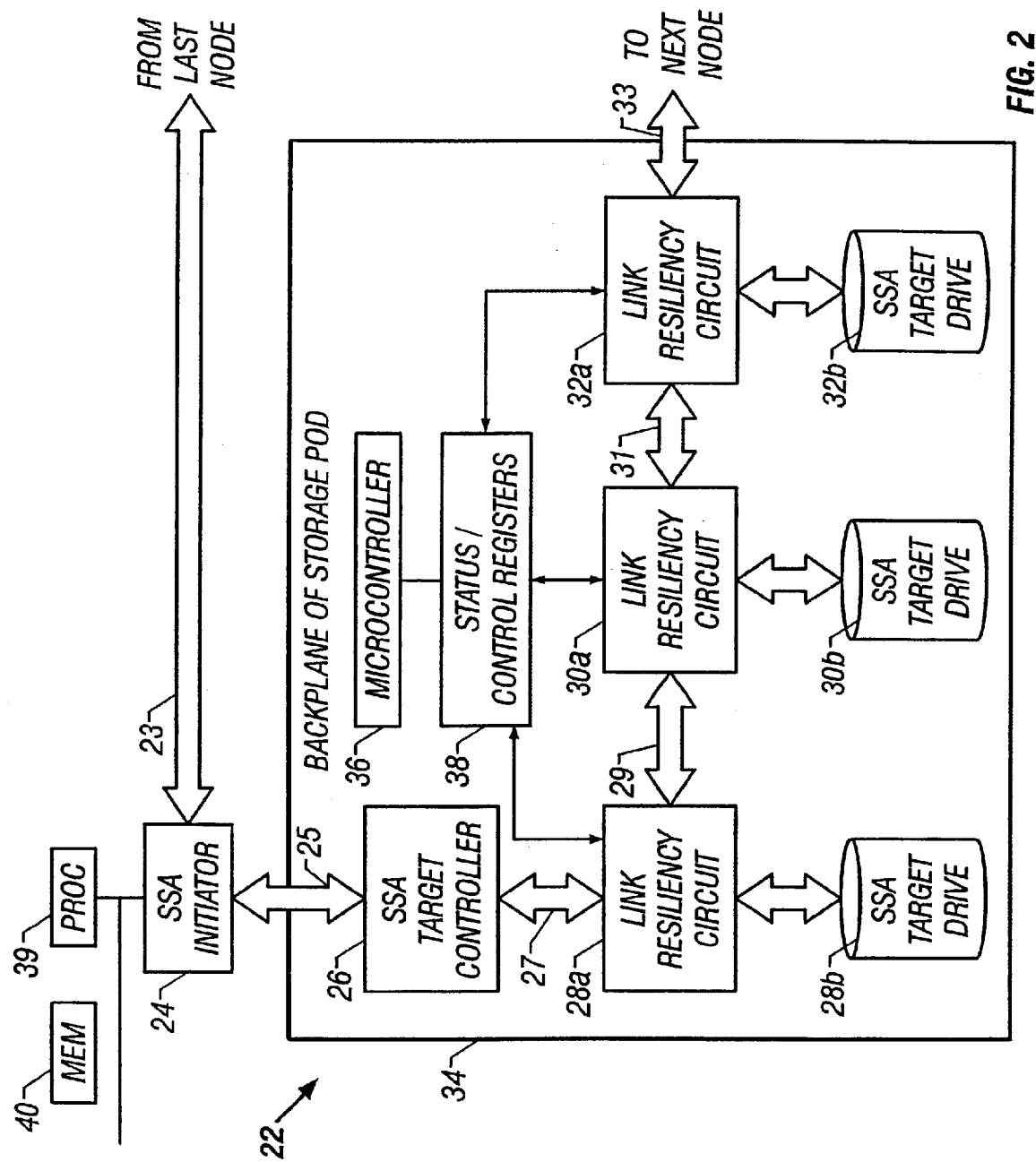
FIG. 2 is a block diagram of a SSA storage subsystem.

Referring next to FIG. 2, an SSA storage subsystem 22 will now be described in greater detail. As before, the SSA storage subsystem 22 is arranged in a SSA loop configuration in which an SSA initiator 24 issues commands to a series of SSA targets, including several of which reside on an intelligent backplane 34 of an apparatus, for example, a disk pod, capable of housing plural storage devices. More specifically, link 23 couples the SSA initiator 24 to that portion of the SSA storage subsystem 22 included in the SSA loop but not illustrated in FIG. 2, link 25 couples the SSA initiator 24 to a first SSA target 26, link 27 couples the first SSA target 26 to a second SSA target 28, link 29 couples the second SSA target 28 to a third SSA target 30, link 31 couples the third SSA target 30 to a fourth SSA target 32 and link 33 couples the fourth SSA target 32 to that portion of the SSA storage subsystem 22 included in the SSA loop but not illustrated in FIG. 2.

In the foregoing description, the backplane 34 is referred to as an "intelligent" backplane. By the term "intelligent", it is intended to refer to the ability of the backplane to independently collect and process data, issue notifications of the occurrence of events based upon information derived from the collected data and accept instructions which alters its operation or the operation of devices residing thereon.

Unlike conventional SSA storage subsystems such as the SSA storage subsystem 10 illustrated in FIG. 1, the SSA initiator 24 is capable of directly exchanging status and control information with the intelligent backplane 34 of the disk pod. This is accomplished by converting the intelligent backplane 34 itself into an additional SSA target for the SSA initiator 24. Specifically, the first SSA target 26 is an SSA target controller 26 installed in the intelligent backplane 34 while the second, third and fourth SSA targets 28, 30 and 32 are drives attached to the backplane 34. Coupled to the SSA target controller 26 is a microcontroller 36. In turn, the microcontroller 36 is coupled to a series of status and/or control registers 38. As will be more fully described below, the SSA target controller 26, in conjunction with the microcontroller 36 and the status and/or control registers 38, enable the exchange of status and control information between the SSA initiator 24 and the intelligent backplane 34. Because intelligent backplane 34 functions as an additional SSA target, SSA storage subsystem 22 provides the advantage of allowing devices which are attached to backplane 34 to be spatially located.

Specifically, for each status register included in the status and/or control registers 38, each target drive 28, 30 and 32 is provided with an output signal line coupled to a status bit of the corresponding status register. Each target drive 28, 30 and 32 will either assert or de-assert the output line based upon certain conditions at the drive, thereby setting or resetting the corresponding status bit in the status register. By periodically polling the status register, the microcontroller 36 will detect any state changes in the status bits. The microcontroller 36 would then advise the SSA initiator 24 of an event related to an operating parameter which caused any such detected state changes by transmitting a message to the SSA initiator 24 via the SSA target controller 26.

Conversely, for each control register included in the status and/or control registers 38, the control register includes a control bit coupled to each target drive 28, 30 and 32 by a control line. To control a selected drive, for example, in response to an event related to an operating parameter which occurred at that target drive and reported to the SSA initiator 24, the SSA initiator 24 would transmit an instruction, via the SSA target controller 26, to the microcontroller 36 to set or reset a selected control bit. By changing the state of a control bit, a control signal, the assertion of which causes an activity to occur, is transmitted to the corresponding drive.

Figure 3A:
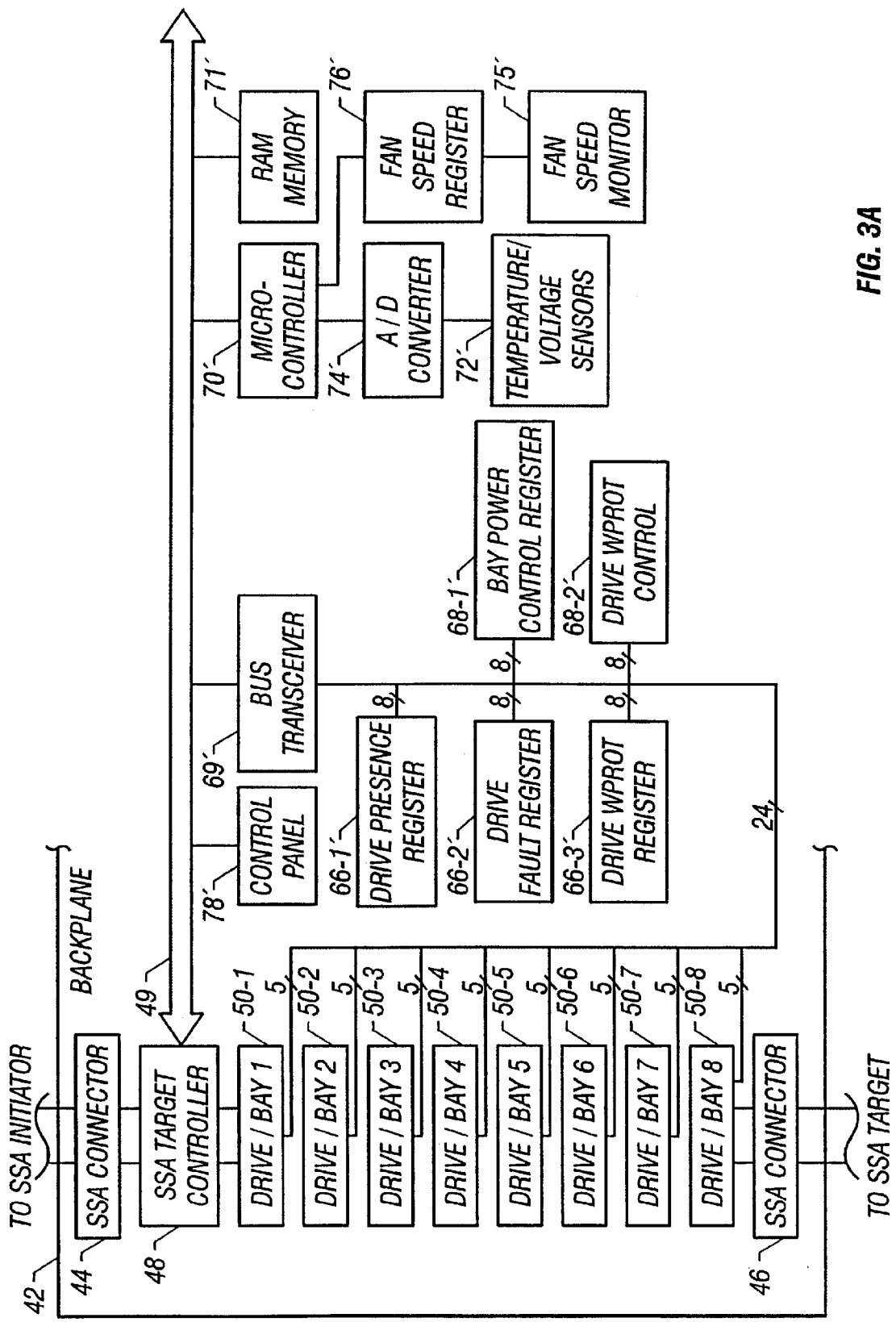
FIG. 3A is an expanded block diagram of a first embodiment of the SSA storage subsystem illustrated in FIG. 2.

Referring next to FIG. 3A, an exemplary intelligent backplane 42 for an SSA storage subsystem such as that illustrated in FIG. 2 will now be described in greater detail. In the embodiment illustrated herein, the intelligent backplane 42 is that portion of a disk pod which interconnects the disk pod with other devices. It is specifically contemplated, however, that the intelligent backplane 42 may be part of various types of apparatuses other than those specifically disclosed herein, which house one or more storage devices.

As may now be seen, a first dual port SSA connector 44 provided on the intelligent backplane 42 couples an SSA initiator (not visible in FIG. 3A) to the intelligent backplane 42 while a second dual port SSA connector 46 provided on the intelligent backplane 42 couples the backplane 42 to a next SSA target (also not visible in FIG. 3A). The first SSA connector 44 bi-directionally couples the SSA initiator to a first SSA target, specifically, an SSA target controller 48 which resides on the intelligent backplane 42. A device suitable for use as the SSA target controller 48 may be, for example, a SSA Protocol Controller manufactured by Symbios Logic Inc. of Wichita, Kans.

Connected in series between the SSA target controller 48 and the second dual port SSA connector 46 are first, second, third, fourth, fifth, sixth, seventh and eighth drives, all of which are SSA targets. Each SSA target drive is insertably mounted in a corresponding disk bay included in the disk pod. In FIG. 3A, the first, second, third, fourth, fifth, sixth, seventh and eighth SSA target drives, together with the corresponding disk bay, are collectively illustrated as drive/bay 50-1 through 50-8, respectively.

It should be noted that the number of SSA target drives and associated disk bays illustrated as residing in the disk pod and included in the SSA storage subsystem is purely exemplary and may be varied without departing from the scope of the present invention. It should be further noted that all of the drives and associated disk bays are included in the SSA storage subsystem, it is specifically contemplated that one or more of the drives and associated disk bays may be excluded from the SSA storage subsystem. For example, a particular disk bay may be empty or a drive installed in that disk bay may be assigned to a second SSA storage subsystem.

Each disk bay 50-1 through 50-8 includes three output status lines, each coupled to a corresponding status register 66-1, 66-2 and 66-3, and two input control lines, each coupled to a corresponding control register 68-1 and 68-2. Again, it should be clearly noted that the number of status and control registers is purely exemplary and may be varied depending on the desired status and control capabilities for the intelligent backplane 42.

Figure 3B:
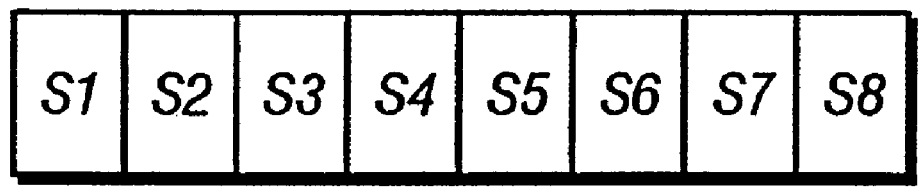
FIG. 3B is a block diagram of an exemplary status register for the intelligent backplane of FIG. 3A.
Figure 3C:
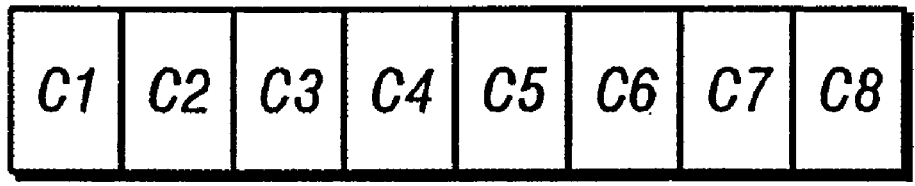
FIG. 3C is a block diagram of an exemplary control register for the intelligent backplane of FIG. 3A.

Referring momentarily to FIGS. 3B–C, exemplary status and control registers 66-N and 68-N may now be seen. Status register 66-N includes a status bit S1–S8 for each drive/bay 50-1 through 50-8 coupled thereto. Upon a change in status of a parameter reportable by a drive/bay to the status register 66-N, the corresponding status bit will be set or reset by asserting or de-asserting the output line coupling the drive/bay and the corresponding status bit. Similarly, control register 68-N includes a control bit C1–C8 for each drive/bay 50-1 through 50-8. To issue a control signal to a selected drive/bay, an SSA initiator issues a command to a target microcontroller which then sets or resets the corresponding control bit, thereby issuing a control signal to the selected drive/bay.

Returning now to FIG. 3A, the status and control registers 66-1 through 66-3 and 68-1 through 68-2 will now be described in greater detail. The status register 66-1 is a drive presence detection register. Each disk bay 50-1 through 50-8 includes a drive presence sensor which detects installation and/or removal of a drive from the disk bay. When the disk bay is empty, the drive presence sensor drives an output line coupled to the corresponding status bit of the drive presence detection register 66-1 to a first, default, level, for example, to a logical "0". When a drive is inserted into the disk bay, the drive presence sensor drives the output line to a second level, for example, to a logical "1".

The status register 66-2 is a drive fault register 66-2. Storage devices which comply with the ANSI X3T10.1 SSA specification are equipped with a drive fault detection line suitable for issuing an alert regarding a drive fault. Traditionally, however, the aforementioned drive fault detection line has been limited to driving a drive fault detection LED physically located at the storage device. Thus, if the storage device was remotely located relative to the remainder of the SSA storage subsystem, for example, in an adjoining room, illumination of the drive fault detection LED may not be detected. Here, however, the drive fault detection line is coupled to the drive fault register 66-2. When the drive is operating normally, the drive fault detection line is held to a first, default, level, for example, to a logical "0". When a fault is detected, the drive asserts the drive fault detection line by driving the line to a second level, for example, to a logical "1".

The status register 66-3 is a drive write protect register 66-3. Storage devices which comply with the X3T10.1 SSA specification are equipped with a drive write protect pin which allows the storage device to be write protected. Typically, drive write protection of the storage device is controlled by a user settable jumper. A drive write connect output line couples the drive write protect pin to the drive write protect register 66-3. When writes to the drive are permitted, the drive write protect line is held to a first, default, level, for example, to a logical "0" by the drive write protect pin. When write protection is enabled, the drive write protect pin is driven to a second level, for example, to a logical "1", thereby asserting the drive write protect line.

Bus transceiver 69 enables the exchange of signals between the bus 49 and the drive presence detection register 66-1, the drive fault register 66-2 and the drive write protect register 66-3 and microcontroller 70 via bus 49. Upon power-up, the microcontroller 70 will determine the state of the status bits of the drive presence detection register 66-1, the drive fault register 66-2 and the drive write protect register 66-3 and stores the acquired information in RAM memory 71. Thereafter, the microcontroller 70 periodically polls the drive presence detection register 66-1, the drive fault register 66-2 and the drive write protect register 66-3 to determine any changes in the state of the status bits S1–S8. If the microcontroller 70 detects a change in the state of any of the status bits for the drive presence detection registers 66-1, the microcontroller 70 will retrieve information stored in the RAM memory 71 as to the type of event occurrence indicated by the detected change in state and issue a notification, via the SSA target controller 48, to the SSA initiator, of the event which has occurred.

For example, if the microcontroller 70 detects that a status bit of the drive presence register 66-1 transitioned from 0 to 1, the microcontroller 70 notifies the SSA initiator that a drive has been inserted in the particular disk bay coupled to the transitioning status bit. As the SSA initiator will be in the process of assigning an numerical SSA address to the drive, the SSA initiator will append physical information related to the disk bay, for example, location of the disk bay to the numerical SSA address. Conversely, if the microcontroller 70 detects that a status bit of the drive presence register 66-1 has transitioned low, the microcontroller 70 notifies the SSA initiator that the drive housed in a particular disk bay has been removed, thereby contemporaneously advising the SSA initiator of the removal of a drive from the disk pod so that the numerical addresses for the devices which comprise the SSA storage subsystem may be reassigned.

The intelligent backplane 42 may be configured to monitor other operating conditions for the occurrence of events.

To provide such enhanced monitoring capabilities, the intelligent backplane should be equipped with additional monitoring sensors and/or status registers. Any such additional status registers may be included in the status registers 66-N or, as disclosed in the embodiment of the invention illustrated in FIG. 3A, independently coupled to the microcontroller 70.

More specifically, installed in the interior of the disk pod housing and coupled to the intelligent backplane 42 are temperature/voltage sensors 72. The temperature/voltage sensors 72 include a voltage sensor for determining the voltage level of power supplied to the disk pod and a temperature sensor for determining the internal operating temperature of the disk pod. The voltage level and operating temperature for the disk pod determined by the temperature/voltage sensors 72 are transmitted to analog-to-digital converter 74 where there are converted into digital values. The converted values of voltage level and operating temperature are then transmitted to the microcontroller 70 which determines whether power or thermal events have occurred by comparing the received values of voltage level and operating temperature to pre-selected operating ranges. If the microcontroller 70 determines that either the voltage level or operating temperature is outside the corresponding pre-selected operating range, the microcontroller 70 will issue a notification to the SSA initiator of the occurrence of a power or thermal event.

The disk pod or other storage structure which houses the drives will typically include one or more cooling fans to maintain the proper ambient temperature within the housing. Depending on its configuration, a cooling fan may be equipped with a monitoring pin or other fan speed monitoring device 75 capable of determining rotating speed of the cooling fan. If so equipped, the fan speed monitoring device will continuously transmit the rotating speed of the cooling fan to fan speed register 76. The microcontroller 70 periodically polls the fan speed register 76 to determine rotating speed of the cooling fan and, by comparing the rotating speed to a pre-selected operating range stored in the RAM memory 71, determines whether the rotating speed is outside the corresponding pre-selected range of rotating speeds. If so, the microcontroller 70 will issue a notification to the SSA initiator of the occurrence of a cooling fan event. For example, if the rotating speed is below the pre-selected range, the microcontroller 70 will issue a notification of a fan underspeed event. Conversely, if the rotating speed is above the pre-selected range, the microcontroller 70 will issue a notification of an fan overspeed event.

The intelligent backplane 42 is further configured such that the SSA initiator for the SSA storage subsystem, or a system administrator located at the terminal where the SSA initiator resides, may evaluate the status information issued by the intelligent backplane 42 and, based on the received information, executed selected ones of a number of control operations. For example, the system administrator may evaluate the status information issued by the intelligent backplane 42 and, based on the received information, issue an instruction to the microcontroller 70 to cause a selected control register to transmit a control signal to the selected drive/bay 50-N which causes a selected activity to occur.

To issue an instruction to a selected drive/bay coupled to the intelligent backplane 42, an SSA initiator will transmit an appropriate instruction to the SSA target controller 48. The SSA target controller 48 examines a header portion of received instruction to determine whether the destination of the instruction is the intelligent backplane 42. Otherwise, the instruction is passed on to the next SSA target 50-1, here, a SSA target drive installed in a disk bay. Upon determining that the destination of a received instruction is the intelligent backplane 42, the SSA target controller 48 propagates the received instruction to the microcontroller 70 for execution. For example, if the received instruction indicates that a specific activity is to occur at a selected disk bay, the microcontroller 70 will set or reset the control bit coupled to the selected drive for the corresponding command register, thereby issuing a control signal to the selected disk bay which causes the specified activity to occur.

As before, the bus transceiver 69 enables the microcontroller 70 to transmit commands to control register 68-1 and drive write protect register 68-2 via the bus 49. The control register 68-1 is a bay power control register. Each disk bay includes a power control line coupled to a corresponding control bit of the bay power control register 68-1. When the control bit is set to a logical "0", the corresponding power control line is de-asserted and the drive bay is powered down. If, however, the control bit is set to a logical "1", the power control line is asserted and the drive bay is powered up. Thus, by setting or resetting selected control bits of the bay power control register 68-1, the SSA initiator may selectively power up or power down a selected disk bay. For example, when a drive is inserted or "hot plugged" into a selected bay, the microcontroller 70 will detect the change in state in the corresponding status bit of the drive presence register 66-1 and notify the SSA initiator that a drive is being inserted in a selected disk bay. In response thereto, the SSA initiator powers up the bays into which the drive is inserted. Since the drive bay into which the drive is inserted is powered down at the time of insertion, hot plugging a drive into this bay does not affect the power provided to the other drives inserted in the disk pod.

The control register 68-2 is a drive write protect control register. It is expected that the X3T10.1 SSA specification will include an active write protect control line capable of switching a storage device into or out of a write protect mode. Each SSA target drive includes a write protect control line coupled to a corresponding control bit of the write protect control register 68-2. To switch a selected SSA target drive into write protect control, the SSA initiator issues a command to set the control bit of the write protect control register 68-2, thereby asserting the write protect control line and switching the selected SSA target drive into write protect control. In this manner, the SSA initiator may selectively switch one or more SSA target drives into write protect mode.

The intelligent backplane 42 may be configured for further control capability by providing a control panel 78 coupled to the bus 49. The control panel 78 includes an LCD or other type of display on which messages issued by the SSA initiator or the local microcontroller may be displayed. For example, if the microcontroller 70 had previously advised the SSA initiator that a particular drive has failed, in addition to appropriate corrective such as that previously described, the system administrator may use the SSA initiator to issue a message such as "fault detected at drive X" to the SSA target controller 48 which, in turn, directs the message to the control panel 78 for display.

Figure 4A:
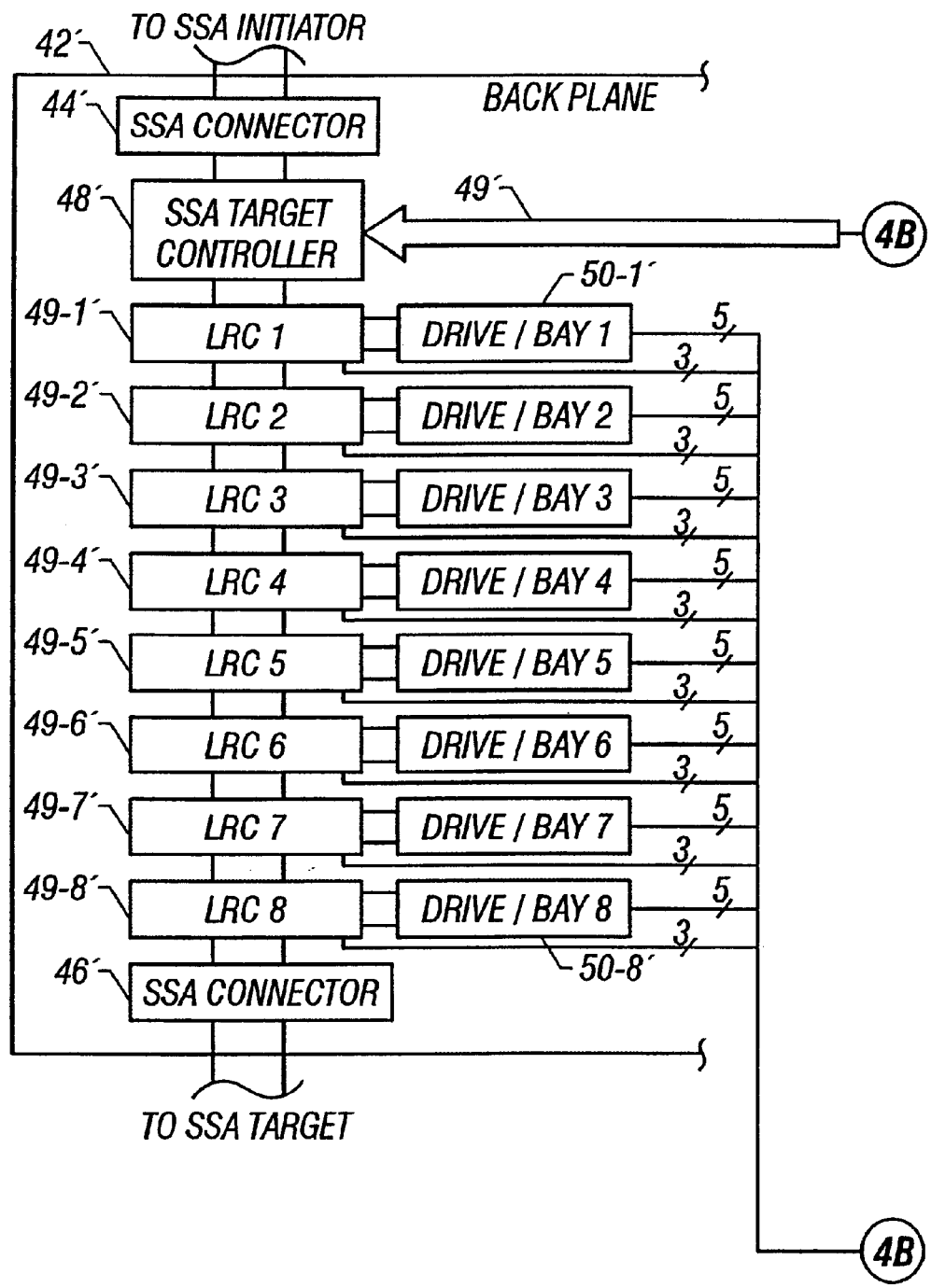
FIG. 4 is an expanded block diagram of a second, preferred, embodiment of the SSA storage subsystem illustrated in FIG. 2.
Figure 4B:
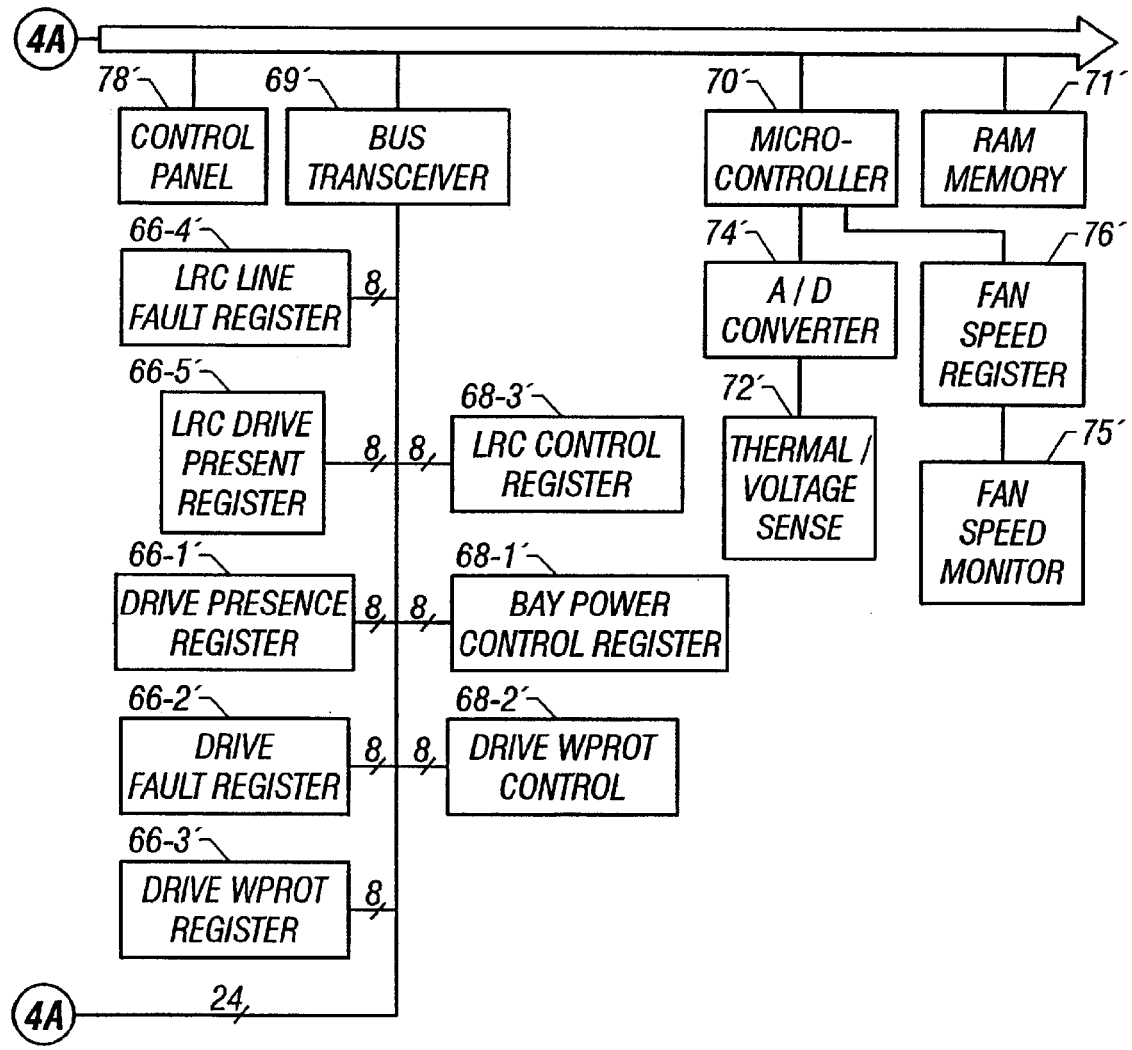

Referring next to FIG. 4, a second preferred embodiment of an intelligent backplane 42' for an SSA storage subsystem such as that illustrated in FIG. 2 will now be described in greater detail. In this embodiment, the intelligent backplane 42' is provided with a series of link resiliency circuits (or "LRCs") for maintaining loop continuity by linking around a drive bay if a drive is not functional or missing. Further details regarding the LRCs, as well as the various status and control registers associated therewith are set forth in U.S. Pat. No. 5,961,958 issued on Aug. 3, 1999 to Bouvier et al. and incorporated by reference as if reproduced in its entirety. Briefly, however, if a SSA target drive is operating properly, data input the corresponding LRC is directed to the SSA target drive. If the SSA target drive has failed or is missing, however, data input the LRC is directed to the LRC corresponding to the next SSA target drive.

In this embodiment of the invention, rather than having SSA target controller 48' and the SSA target drives directly connected in series between SSA connectors 44' and 46', a corresponding LRC 49-1' through 49-8' are provided for, and connected to the front end of each of the SSA target drives. Each SSA target drive is insertably mounted in a corresponding disk bay included in a disk pod. In FIG. 4, the SSA target drives, together with the corresponding disk bays, are collectively illustrated as drive/bays 50-1' through 50-8', respectively. As before, the number of SSA target drives and associated disk bays illustrated as residing in the disk pod and included in the SSA storage subsystem is purely exemplary and may be varied without departing from the scope of the present invention.

In addition to the drive presence register 66-1', drive fault register 66-2' and the drive write, protect register 66-3', in this embodiment of the invention, each LRC 49-1' through 49-8' includes first and second output lines, each coupled to a corresponding status register 66-4' and 66-5'. Similarly in addition to the input control lines which couple each drive/bay 50-1' through 50-8' to the control registers 68-1' and 68-2', in this embodiment of the invention, each LRC 49-1' through 49-8' includes an input control line coupled to a control register 68-3'.

Continuing to refer to FIG. 4, the newly added status registers 66-4' and 66-5' and the newly added control register 68-3' will now be described in greater detail. The status registers 66-4' through 66-5' include a LRC line fault register 66-4' and an LRC drive present register 66-5' respectively connected to the LRC line fault output line and the LRC drive present output line for each of the LRCs 49-1' through 49-8'. When the lines which serially connect a SSA target drive to the remainder of the SSA storage subsystem are functioning properly, the LRC line fault detection line is held to a first, default, level, for example, to a logical "0". When a line fault is detected on the lines which serially connect the SSA target drive to the remainder of the SSA storage subsystem, the LRC asserts the LRC line fault detection line by driving the line to a second level, for example, to a logical "1", thereby setting the corresponding status bit in the LRC line fault detection register 66-4'. By periodically polling the LRC line fault detection register 66-4', the microcontroller 70' will detect any state changes in the status bits of the LRC line fault detection register 66-4', and report the occurrence and location of any line faults to the SSA initiator by transmitting a notification message via the SSA target controller 48.

When the SSA target drive coupled to the LRC is present and operating properly, the LRC drive present register is held to a first, default, level, for example, to a logical "0". If the drive is removed or otherwise disconnected from the LRC, the LRC asserts the LRC drive present line by driving the line to a second level, for example, to a logical "1", thereby setting the corresponding status bit in the LRC drive present register 66-5'. As before, by periodically polling the LRC drive present register 66-5', the microcontroller 70' will detect any state changes in the status bits of the LRC line fault detection register 66-5', and report the occurrence and location of any removals of SSA target drives to the SSA initiator by transmitting a notification message via the SSA target controller 48'.

Bus 49' and bus transceiver 69' enables the exchange of signals between the microcontroller 70' and the LRC line fault register 66-4' and the LRC drive present register 66-5'. Upon power-up, the microcontroller 70' will determine the state of the status bits of the LRC line fault register 66-4' and, the LRC drive present register 66-5' and stores the acquired information in RAM memory 71'. Thereafter, the microcontroller 70' periodically polls the LRC line fault register 66-4' and the LRC drive present register 66-5' to determine any changes in the state of the status bits S1–S8. If the microcontroller 70' detects a change in the state of any of the status bits, the microcontroller 70' will retrieve information stored in the RAM memory 71' as to the type of event occurrence indicated by the detected change in state and issue a notification, via the SSA target controller 48', to the SSA initiator, of the event which has occurred.

The control register 68-3' is an LRC control register 68-3'. Each LRC 49-1' through 49-8' includes a select input line coupled to a corresponding control bit of the LRC control register 68-3'. When the LRC control bit is set to a logical "0", the select input line is de-asserted and data directed to the LRC is passed to the SSA target drive. If, however, the control bit is set to a logical "1", the select input line is asserted and data directed to the LRC is passed to an adjacent LRC. Thus, by setting or resetting selected control bits of the LRC control bit 66-3', the SSA initiator may selectively heal around a missing drive or keep the string of SSA devices opened.

The intelligent backplane 42' is further configured such that the SSA initiator for the SSA storage subsystem is able to execute at least one LRC control operation. For example, the SSA initiator, or a system administrator located at the terminal where the SSA initiator resides, may evaluate the status information issued by the intelligent backplane 42' and, based on the received information, issue an instruction to the microcontroller 70' to cause the LRC control register 68-3' to assert the select signal to a selected LRC to cause the selected LRC to heal the detected line fault. In this manner, the SSA initiator, rather than a discrete timing circuit, can determine how long after a line fault has occurred should the LRC heal the fault. It should be noted, however, that while the embodiment of the invention illustrated in FIG. 4 shows a single LRC control register used to control the time required for the LRCs 49-1' through 49-8' to heal a line fault, it should be noted that, by providing plural LRC control registers, additional operations of the LRCs may be remotely controlled by the SSA initiator.

To issue an instruction to a selected LRC coupled to the intelligent backplane 42', an SSA initiator will transmit an appropriate instruction to the SSA target controller 48'. The SSA target controller 48' examines a header portion of received instruction to determine whether the destination of the instruction is the intelligent backplane 42'. Otherwise, the instruction is passed on to the next SSA target 50-1', here, a SSA target drive installed in a disk bay. Upon determining that the destination of a received instruction is the intelligent backplane 42', the SSA target controller 48' propagates the received instruction to the microcontroller 70' for execution. For example, if the received instruction indicates that a selected LRC should heal around a missing drive, the microcontroller 70' will set the control bit of the LRC control register which is coupled to the LRC corresponding to the missing drive, thereby issuing a control signal to the selected LRC which causes the specified activity to occur. In addition, microcontroller 70' can also issue control signals directed to an LRC independently.

Thus, there has been described and illustrated herein, an SSA storage subsystem having an SSA initiator capable of exchanging status and control information with SSA target drives. Such an improvement has been achieved by providing intelligence to the backplane where the SSA target drives reside. However, those skilled in the art should recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A serial storage architecture (SSA) storage subsystem, comprising:
    a backplane, wherein the backplane is configured as a SSA target by virtue of the backplane comprising a SSA target controller;
    a SSA initiator; and
    first and second SSA targets residing on the backplane, the SSA initiator and the first and second SSA targets arranged in an SSA loop, wherein the SSA target controller is configured to allow the SSA initiator to communicate with the first and second SSA targets, wherein a control register sends control information to said first and second SSA targets in response to commands issued by said SSA initiator.

2. The SSA storage subsystem of claim 1, further comprising a controller coupled to said first and second SSA targets and to said SSA target controller, wherein said SSA initiator is configured to exchange information about said first and second SSA targets with said controller.

3. The SSA storage subsystem of claim 2, wherein the control register comprises a control bit, the control bit operable to maintain information corresponding to control information.

4. The SSA storage subsystem of claim 2, wherein the control register comprises a status bit, the status bit operable to maintain information corresponding to status information.

5. The SSA storage subsystem of claim 2, wherein the control information comprises an operating parameter.

6. The SSA storage subsystem of claim 1, wherein the first and second SSA targets are storage devices.

7. The SSA storage subsystem of claim 1, further comprising the SSA initiator operable to maintain bi-directional communication with the first and second SSA targets.

8. A computer system comprising:
    a processor;
    a memory coupled to the processor;
    a serial storage architecture (SSA) storage subsystem coupled to said processor and the memory, the SSA storage subsystem including a backplane, wherein the backplane is configured as a SSA target by virtue of the backplane comprising a SSA target controller;
    a first and second SSA target residing to the backplane; and
    a SSA initiator operably arranged with the first and second SSA target in an SSA loop, wherein a control resister sends control information to said first and second SSA targets in response to commands issued by the SSA initiator.

9. The computer system of claim 8, further comprising a controller coupled to said first and second SSA targets and to said SSA target controller, wherein said SSA initiator is configured to exchange information about said first and second SSA targets with said controller.

10. The computer system of claim 8, wherein said first and second SSA targets are storage devices.

11. The computer system of claim 9, further comprising the control register including at least two status information bits, wherein each status information bit corresponds to the first and second SSA targets.

12. The computer system of claim 9, further comprising the control register including a plurality of bits, the plurality of bits operable to exchange information with the SSA initiator.

13. The computer system of claim 9, wherein the controller comprises a microcontroller.

14. The computer system of claim 9, wherein the first and second SSA targets further comprise a LED detection light, the detection light operable to illuminate in response to the control register.

15. A serial storage architecture (SSA) storage subsystem, comprising:
    a SSA target initiator communicatively coupled to a SSA target controller via a communication link; and
    a backplane placed in communication with the SSA target initiator, the backplace including:
        the SSA target controller operably configured as a SSA target;
        at least one SSA storage device residing on the backplane, the SSA target initiator and the at least one SSA storage device arranged in an SSA loop, wherein the SSA target controller operable to allow communications between the SSA target initiator and the SSA storage device; and
        a microcontroller communicatively coupled to the SSA target controller and the SSA storage device, the microcontroller operable to exchange information with the SSA target initiator about the SSA storage device, wherein the microcontroller transmits control information between the SSA target initiator and the backplane based on commands issued by the SSA target initiator.

16. The SSA storage subsystem of claim 15, wherein the microcontroller includes a control register operable to direct the SSA storage device to perform a particular activity.

17. The SSA storage subsystem of claim 15, wherein the microcontroller includes a status register operable to indicate a status of the SSA storage device.

18. The SSA storage subsystem of claim 16, further comprising the storage device having a LED fault light, the LED fault light operable in response to commands from the control register.

* * * * *